United States Patent
Eickelkamp et al.

(10) Patent No.: US 9,188,023 B2
(45) Date of Patent: Nov. 17, 2015

(54) OIL SUPPLY SYSTEM FOR A STATIONARY TURBOMACHINE

(75) Inventors: Jan Eickelkamp, Oberhausen (DE); Jürgen Hahn, Bochum (DE); Christoph Jüttner, Dortmund (DE); Barbara Malangone, Gelsenkirchen (DE); Horst Uwe Rauh, Essen (DE); Gerhard Simon, Essen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 419 days.

(21) Appl. No.: 13/825,328

(22) PCT Filed: Sep. 20, 2011

(86) PCT No.: PCT/EP2011/066282
§ 371 (c)(1),
(2), (4) Date: Mar. 21, 2013

(87) PCT Pub. No.: WO2012/038402
PCT Pub. Date: Mar. 29, 2012

(65) Prior Publication Data
US 2013/0213001 A1    Aug. 22, 2013

(30) Foreign Application Priority Data
Sep. 22, 2010    (EP) .................................... 10178310

(51) Int. Cl.
*F01D 25/20* (2006.01)
*F02C 7/06* (2006.01)
*F16N 7/38* (2006.01)
(Continued)

(52) U.S. Cl.
CPC . *F01D 25/20* (2013.01); *F02C 7/06* (2013.01); *F16N 7/38* (2013.01); *F16N 39/02* (2013.01); *F15B 1/26* (2013.01); *F15B 1/265* (2013.01); *F15B 21/042* (2013.01); *F28D 20/0039* (2013.01); *F28D 2020/0086* (2013.01); *F28D 2021/0049* (2013.01)

(58) Field of Classification Search
CPC ........... F01D 25/18; F01D 25/20; F02C 7/06; F02B 39/14; F16N 7/38; F16N 17/02; F16N 39/02; F15B 21/042
See application file for complete search history.

(56) References Cited

U.S. PATENT DOCUMENTS 3,475,907 A * 11/1969 Kellett .................... F02C 7/236
                                                        184/6
4,105,093 A    8/1978 Dickinson
(Continued)

FOREIGN PATENT DOCUMENTS

CN    201228681 Y    4/2009
CN    201326421 Y    10/2009
(Continued)

*Primary Examiner* — Craig Kim

(57) ABSTRACT

An oil supply system for a stationary turbomachine is provided. A safe operation of the turbomachine is enabled even at ambient temperatures of up to 60° C. for a plurality of hours in a novel connection arrangement of the components of the oil supply system, such as the oil tank, pump a, and heat exchanger, as well as the pipeline system, without one of the components having to be designed for a further increased operating temperature. The oil tank has two regions stacked horizontally one above the other for storing the oil. The two regions are largely or completely separated from each other by a separating element.

7 Claims, 1 Drawing Sheet

(51) Int. Cl.
*F16N 39/02* (2006.01)
*F15B 21/04* (2006.01)
*F15B 1/26* (2006.01)
*F28D 20/00* (2006.01)
*F28D 21/00* (2006.01)

(56) References Cited

U.S. PATENT DOCUMENTS

| | | | | |
|---|---|---|---|---|
| 4,446,377 | A | * | 5/1984 | Kure-Jensen ............ F02C 7/32 184/6.11 |
| 4,531,358 | A | * | 7/1985 | Smith .................... F16N 29/02 184/6.11 |
| 5,611,411 | A | | 3/1997 | Reilly, III |
| 6,735,952 | B2 | * | 5/2004 | Olsen .................... F01D 25/16 60/39.08 |
| 2003/0099538 | A1 | | 5/2003 | Liu |
| 2004/0016601 | A1 | * | 1/2004 | Brouillet ................ F01D 25/18 184/103.1 |
| 2012/0183391 | A1 | * | 7/2012 | Czechowski ........... F04D 13/12 415/175 |

FOREIGN PATENT DOCUMENTS

| | | |
|---|---|---|
| CN | 101586527 A | 11/2009 |
| DE | 4304482 A1 | 8/1994 |
| EP | 1298298 A2 | 4/2003 |
| EP | 2123906 A1 | 11/2009 |
| FR | 2621562 A1 | 4/1989 |
| JP | S5504998 | 8/1978 |
| JP | 55128611 A | 10/1980 |
| JP | S61078112 | 10/1987 |
| JP | 62191349 | 12/1987 |

\* cited by examiner

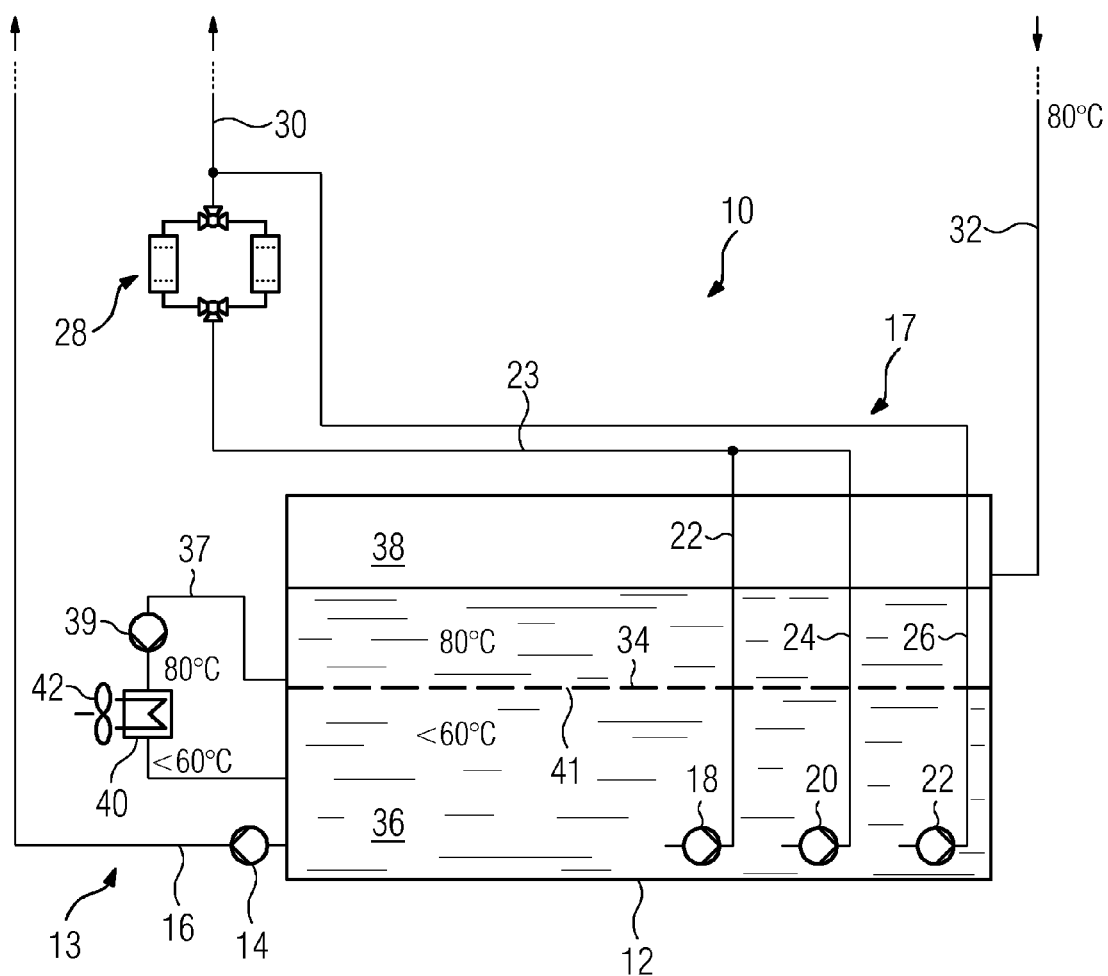

OIL SUPPLY SYSTEM FOR A STATIONARY TURBOMACHINE

CROSS REFERENCE TO RELATED APPLICATIONS

This application is the US National Stage of International Application No. PCT/EP2011/066282 filed Sep. 20, 2011 and claims the benefit thereof. The International Application claims the benefits of European application No. 10178310.8 filed Sep. 20, 2010, both of the applications are incorporated by reference herein in their entirety.

FIELD OF THE INVENTION

The invention relates to an oil supply system for a stationary turbomachine, having an oil tank, at least one pump, a heat exchanger for cooling the oil, and a conduit system connecting said components.

BACKGROUND OF THE INVENTION

The oil supply systems known from the prior art are used to lubricate the radial and axial bearings of gas turbines, for example. The rotor of the gas turbine is supported in the bearings of the gas turbine and generally rotates at a speed of 3000 rpm or 3600 rpm during operation of the gas turbine. A generator connected to the rotor then converts the energy supplied to the gas turbine in the form of fossil fuel into electric energy. In this arrangement, the bearings generally have a lift oil system and a lubricating oil system. The lift oil is required in the radial bearing in order to enable the gas turbine to be started or shut down at a relatively low rotor speed through hydrostatic lubrication without the occurrence of damage in the bearings and to the rotor. The lubricating oil system is used to supply the bearings in rated operation, i.e. at relatively high speeds, which allow hydrodynamic lubrication. The lift oil system and the lubricating oil system often have a common oil tank, in which the oil returned from the bearings is stored. The oil stored in the oil tank after use is generally at a temperature of 80° C. to 90° C. owing to the friction to which it is subjected in the bearing and owing to the environment in which it is used. The oil tank is generally dimensioned in such a way that the quantity of lubricating oil fed back can remain in it long enough for the air dissolved therein to escape to a sufficient extent before the oil is once again fed to the lift oil and lubricating oil systems.

A heat exchanger is furthermore provided in the inlet conduit of the lubricating oil system in order to cool the lubricating oil taken from the oil tank at a temperature of about 70° C. to an inlet temperature of about 40° C.-50° C. The heat exchanger is designed as an air-cooled or water-cooled heat exchanger, for example, and may be fitted with a cooling fan. A system of this kind is known from DE 43 04 482 A1, for example.

However, there is the disadvantage that cooling of the lubricating oil to 50° C., the maximum permissible inlet temperature, can no longer be guaranteed with the air-cooled heat exchanger in the case of very warm ambient temperatures of about 50° C. and, in some rare cases, even higher, and that a water-cooled heat exchanger is generally not available in pure gas turbine power plants. In such cases, the inlet temperature of the lubricating oil can only be reduced to a value of 50° C. (or less) if a compression-type refrigerating machine is inserted in the feed conduit in addition to the air-cooled heat exchanger. However, this conversion is associated with higher costs and impairs the overall efficiency of the plant due to the increase in its own consumption through the use of the compressor of the refrigerating machine. Moreover, the use of the additional component—the compression-type refrigerating machine—compromises the availability of the gas turbine. Another limiting boundary condition in addition is that the lift oil pump provided in the lift oil circuit must not be operated at an oil temperature of 73° C. or above. This is due to the fact that exceeding the oil temperature leads to an excessively low oil viscosity (e.g. less than 10 cSt), which no longer guarantees safe and reliable operation of the lift oil pump. Although there would also be the possibility of using pumps suitable for these conditions, said pumps would be significantly more expensive to procure.

Moreover, there is the risk, when the oil temperature of about 75° C. is exceeded, that the bearings will no longer be adequately cooled in operation. This too would compromise safe operation of the gas turbine.

U.S. Pat. No. 4,105,093 has furthermore disclosed the practice of using pressurized reservoirs in lubricating oil systems. This reservoir is supplied with cooled hydraulic fluid by means of a pump and a heat exchanger. The disadvantage with this embodiment is that the pumps are located in the relatively warm tank region, and therefore the abovementioned problems as regards viscosity can also occur there. Moreover, U.S. Pat. No. 5,611,411 discloses an uncooled lubricating oil system for a turbine generator, the vertically divided tank of which allows lubricant equalization by means of a flap.

SUMMARY OF THE INVENTION

It is therefore the object of the invention to provide an oil supply system for a stationary turbomachine which ensures adequate cooling of the oil of an oil supply system, even at very warm ambient temperatures of between 50° C. and 70° C., without the need for high-performance components or components with higher permissible operating temperatures.

The object underlying the invention is achieved by an oil supply system in accordance with the features of the independent claim. Advantageous embodiments of the oil supply system are indicated in dependent claims.

According to the invention, the oil supply system mentioned at the outset has an oil tank with two regions stacked horizontally one above the other for storing the oil, said two regions being largely or completely separated from each other by a separating element. The spatial division is made in order to store oil at two different temperature levels in regions lying one above the other. At the same time, the intention is to avoid unhindered mixing of warm and cool oil to a large extent or completely. In this case, provision is preferably made for the lubricating oil heated by the process of lubrication to be returned to the upper region of the oil tank. Owing to the still relatively high temperature and a sufficient dwell time of the lubricating oil in the upper region of the oil tank, the air dissolved in the returned oil can furthermore escape. The deaerated oil is drawn in by a circulating pump provided in a circulation conduit and is passed through an air-cooled heat exchanger connected in series, in which it is cooled to a temperature which is slightly above ambient temperature. In the worst case, therefore, the oil is cooled to a temperature of about 60° C. The cooled oil is then fed into the lower region of the oil tank. There, it is stored in order to hold it ready for the purposes described. In order to ensure that the lift oil pump can always be supplied with sufficient cold oil, the connection of the lift oil conduit to the oil tank is preferably positioned in the vicinity of the outlet region of the circulation conduit. Where present, a main, auxiliary and/or emergency lubricating pump draws oil from the lower temperature zone of the oil tank.

By relocating the heat exchanger of the oil supply system in the circulation conduit, i.e. ahead of the lift oil and lubricating oil pumps, it is possible to raise the inlet temperature of the lubricating oil approximately to ambient temperature without simultaneously exceeding the maximum intake temperature of 73° C. for the operation of the lift oil pump since it is highly unlikely that such high ambient temperatures will occur for any length of time at the location of the turbomachine. By raising the inlet temperature and hence also the return temperature as compared with the temperatures in the prior art, it is possible to dissipate the heat introduced by the lubricating oil without an additional compression-type refrigerating machine, even at very high ambient temperatures of about 60° C., owing to the possibility of boosting the cooling performance (greater temperature reduction Δt) of the heat exchanger, the air-cooled heat exchanger now being capable of delivering this performance.

Separation of the two regions in a manner which is not quite complete ensures that there is always sufficient oil stored in the lower region and hence that said lower region cannot run dry in the event of a breakdown. Moreover, this means that no vacuum arises in the lower region of the oil tank if oil is taken from the oil tank by the pumps and, at the same time, no oil is delivered by the circulating pump.

In contrast, complete separation of the two regions ensures that only cooled oil is drawn in from the oil circuits at any time. If necessary it is also possible in this case for the lower region of the oil tank to have a dedicated venting system.

The conduit system comprises a circulation conduit, in which a circulating pump and the air-cooled heat exchanger are provided and which connects the two regions of the oil tank to one another outside the oil tank in a manner which allows fluid transfer, such that oil can be pumped out of the upper region of the oil tank into the lower region of the oil tank by the circulating pump. The conduit system furthermore comprises a lift oil conduit, the first end of which is arranged for removal of lift oil from the oil tank in the lower region of the oil tank, wherein a lift oil pump is provided in the lift oil conduit as one of the at least one pumps.

The ends of the circulation conduit and of the lift oil conduit which open into the lower region are preferably arranged on the same side of the oil tank. According to another advantageous embodiment, the conduit system comprises at least one lubricating oil conduit, the respective first ends of which are arranged in the lower region of the oil tank to enable lubricating oil to be removed from the oil tank, and in each of which a lubricating oil pump is provided as one of the at least one pumps.

It is advantageous if the conduit system has an oil return conduit as a return for returning the oil from the turbomachine to the oil tank, said conduit opening into the upper region of the oil tank.

As another preferred option, that end of the lift oil conduit which opens into the lower region and that end of the oil return conduit which opens in the upper region are arranged on opposite sides of the oil tank. In addition or as an alternative, provision is preferably made for the connection, arranged in the upper region, of the circulation conduit and the oil return conduit which opens in the upper region to be arranged on opposite sides of the oil tank. In other words: the connection of the conduit feeding relatively warm oil to the oil tank is as far as possible away from the connections of the conduit taking lift oil from the oil tank, as seen in the direction of flow of the oil within the oil tank, in order to prevent premature intake and reuse or supply of oil which is still too warm and/or still contains too much air.

BRIEF DESCRIPTION OF THE DRAWINGS

Further advantages and features of the invention are explained in greater detail by means of an illustrative embodiment described in the description of the FIGURE, where: the single FIGURE shows a schematic representation of an oil supply system of a stationary turbomachine.

DETAILED DESCRIPTION OF THE INVENTION

The single FIGURE shows a schematic representation of an oil supply system 10 of a stationary turbomachine, which is not shown specifically. The turbomachine is preferably designed as a stationary gas turbine. The oil supply system 10 comprises an oil tank 12 for storing the oil which the gas turbine requires for lubrication and to lift the rotor of the gas turbine in corresponding bearings. The oil supply system 10 furthermore comprises a lift oil system 13 having a lift oil pump 14, which is arranged in a lift oil conduit 16. The downstream end of the lift oil conduit 16 opens onto the bearings of the gas turbine in order to supply them with lift oil. In this case, the lift oil pump 14 is designed as a high-pressure pump.

According to the illustrative embodiment shown in the single FIGURE, a lubricating oil system 17 comprises three lubricating oil conduits 22, 24, 26, in which respective pumps 18, 20, 22 are arranged as main, auxiliary and emergency lubricating pumps. The lubricating oil conduits 22, 24 are connected to form a common lubricating oil conduit 23, in which an oil filter system 28 is provided. Behind the oil filter system 28, the lubricating oil conduit 23 and the lubricating oil conduit 26 are connected to form a further lubricating oil conduit 30, the downstream end of which opens onto the bearings of the gas turbine in order to make available lubricating oil to said bearings.

The oil flowing back from the bearings, whether it is lift oil or lubricating oil, is returned to the oil tank 12 via an oil return conduit 32, and therefore both the lift oil system 13 and the lubricating oil system 17 have a closed oil circuit.

The oil tank 12 is fitted with a separating element 34. The separating element 34 is configured as a horizontally extending plate in the oil tank 12, for example, and divides the oil tank 12 into two regions 36, 38 situated one above the other. The first region 36 lies below the separating element 34 and the second region 38 of the oil tank 12 lies above the separating element 34. The first region 36 is also referred to as the lower region and the second region 38 is also referred to as the upper region.

In order to avoid the use of a larger oil tank 12 or the use of an increased quantity of oil, it is possible for the separating element 34 to be configured as a perforated separating element. The holes 41 in the separating element are relatively small in number and tend to be small in diameter, thus allowing only a small proportion of the relatively hot oil that is generally stored in the upper region 38 to pass through the holes 41 into the lower region 36 of the oil tank 12, thereby ensuring that the oil temperature there is kept at the lower level.

In this case, the oil return conduit 32 opens into the upper region 38 of the oil tank 12. On the opposite side of the oil tank 12 from the end of the oil return conduit 32, a circulation conduit 37 is connected to the upper region 38. In this circulation conduit 37, a circulating pump 39 and a heat exchanger 40 are connected in series. The circulation conduit 37 opens into the lower region of the oil tank 12. Through the circulation conduit 37, oil can be pumped out of the upper region 38 of the oil tank 12 into the lower region 36 of the oil tank 12.

In stationary operation of the gas turbine, heated oil, having a temperature of about 80° C. for example, passes through the oil return conduit 32 into the upper region 38 of the oil tank 12. Relatively warm oil is therefore stored in the upper region 38 of the oil tank 12. Owing to the still relatively high temperature and the adequate dwell time, the air that is still dissolved in the oil can escape. The oil will then be pumped out of the upper region 38, via the circulation conduit 37, into the lower region 36 of the oil tank 12 with the aid of the circulating pump 39. At the same time, the pumped oil flows through the heat exchanger 40, which cools the oil to a lower temperature. The heat exchanger 40 is preferably an air-cooled heat exchanger with a cooler fan 42, thereby enabling the heat exchanger to be operated in a particularly efficient manner. With the aid of the air-cooled heat exchanger 40, the circulated oil is cooled approximately to ambient temperature or slightly above. Since ambient temperatures of 55° C. for several hours are very rare at the locations of stationary gas turbines, the possibility of oil having a temperature of more than 60° C. after cooling can be ruled out in principle. Thus, the oil in the lower region 36 of the oil tank 12 is always at a temperature of no more than 60° C.

Both the lift oil conduit 16 and the lubricating oil conduits 22, 24, 26 are connected to the lower region 36 in a manner which allows fluid transfer. This ensures that each of said conduits 16, 22, 24, 26 always draws in oil and that each pump 14, 18, 20, 22 of the lubricating oil system 17 and of the lift oil system 13 always pumps oil to the bearings of the gas turbine at a maximum temperature of 60° C. This ensures that the lift oil pump 14 also draws in oil at a temperature which is well below the critical intake temperature of 73° C. This avoids the use of a more powerful lift oil pump or the use of a lift oil pump with a higher permissible operating temperature than 73° C., above which the viscosity can be too low to operate the pump.

Another advantage of the invention is that a bypass circuit is no longer required to regulate the lubricating oil inlet temperature in the lubricating oil conduits 22, 23, 24, 26, 30. Regulation is accomplished by lowering or increasing the delivery volume of the circulating pump 39 or by regulating the speed of the cooler fans 42, for example.

The use of a circulating pump 39 is not absolutely essential. According to an alternative embodiment (not shown), the circulating pump 39 can also be eliminated without being replaced. In this case, the oil tank 12 should be of appropriate design, having a separating element 34 which completely separates the two regions 36, 38. The circulation conduit 37 is then connected in such a way that additional oil can always flow, or be drawn in by the pumps, through the heat exchanger, from the upper region 38 into the lower region 36.

Overall, the invention discloses an oil supply system 10 for a stationary gas turbine in which reliable operation of the gas turbine is made possible, even in the case of ambient temperatures of up to 60° C. over several hours, by virtue of a novel interconnection of the components of the oil supply system, such as the oil tank 12, the pumps 14, 18, 20, 22, the heat exchanger 40 and the conduit system, without the need to design one of these components for an even higher operating temperature. For this purpose, provision is made according to the invention for the oil tank 12 to have two regions 36, 38 stacked horizontally one above the other for storing the oil, said two regions 36, 38 being largely or completely separated from each other by a separating element 34.

The invention claimed is:

1. An oil supply system for a stationary turbomachine, comprising:
   an oil tank for storing oil comprising a lower region and an upper region that are stacked horizontally one above the other and are separated from each other by a separating element;
   a circulation conduit comprising a circulating pump for pumping the oil out of the upper region into the lower region;
   a heat exchanger provided in the circulation conduit for cooling the oil; and
   a lift oil conduit for removal of lift oil comprising a lift oil pump, wherein an end of the lift oil conduit is open into the lower region.

2. The oil supply system as claimed in claim 1, wherein an end of the circulation conduit and the end of the lift oil conduit open into the lower region are arranged on same side of the oil tank.

3. The oil supply system as claimed in claim 1, further comprising a lubricating oil conduit for removal of lubricating oil comprising a lubricating oil pump, and wherein an end of the lubricating oil conduit is open into the lower region.

4. The oil supply system as claimed in claim 1, further comprising an oil return conduit for returning the oil to the oil tank, and wherein an end of the oil return conduit is open into the upper region.

5. The oil supply system as claimed in claim 4, wherein the end of the lift oil conduit open into the lower region and the end of the oil return conduit open into the upper region are arranged on opposite sides of the oil tank.

6. The oil supply system as claimed in claim 4, wherein an end of the circulation conduit open into the upper region and the end of the oil return conduit open into the upper region are arranged on opposite sides of the oil tank.

7. A stationary gas turbine, comprising:
   an oil supply system as claimed in claim 1.

* * * * *